United States Patent Office 2,786,738
Patented Mar. 26, 1957

2,786,738

PRODUCTION OF AN ANTIMONY-CONTAINING FLUORINATING AGENT

Robert P. Ruh and Ralph A. Davis, Midland, Mich., assignors to The Dow Chemical Company, Midland, Mich., a corporation of Delaware No Drawing. Application November 3, 1950, Serial No. 194,024

6 Claims. (Cl. 23—88)

This invention relates to the production of an antimony-containing fluorinating agent, and, more particularly, to the fluorination of a spent antimony fluorobromide, i. e., one containing insufficient fluorine to be an effective fluorinating agent.

It has been known for over half a century that chlorinated alkanes are fluorinated by antimony fluorochlorides. Brominated alkanes are fluorinated in a similar manner by antimony fluorobromides. In such processes, the fluorine is transferred from the antimony fluorochloride or fluorobromide to the chloro- or bromoalkane, leaving the antimony halide "spent," i. e. largely depleted in fluorine. U. S. Patents 2,005,705—2,005,712 correctly teach that an antimony fluorochloride which becomes spent during a fluorination process can be regenerated in situ by the addition of hydrogen fluoride. These patents also suggest that spent antimony fluorobromides can be regenerated in situ in a similar manner.

It has been found however, that this suggestion is untrue, and that spent antimony fluorobromides are not appreciably affected by hydrogen fluoride. This failure of reaction is observed regardless of whether it is sought to regenerate a spent antimony fluorobromide by means of hydrogen fluoride in the course of fluorinating a bromoalkane or as an operation entirely independent of any fluorination.

It is therefore the principal object of the invention to provide a practicable method for regenerating spent antimony fluorobromides.

The process of the invention is applicable not only to the regeneration of totally spent antimony fluorobromides, but also to those which are only partially spent. Thus, in the course of fluorinating a bromoalkane with an antimony fluorobromide, the latter will continue to react until the fluorine has been removed almost quantitatively. The agent therefore becomes almost totally spent, containing on the average only a small fraction of an atom of fluorine per antimony atom, and consisting mainly of antimony bromide. Such agents obviously need regeneration. On the other hand, it is impractical to start the reaction of a bromoalkane with any partially spent antimony fluorobromide containing less than one fluorine atom per antimony atom, so that such agents also require regeneration. The process of the invention may, if desired, also be applied to the regeneration of antimony fluorobromides containing more than one atom of fluorine per antimony atom.

The invention depends upon the discovery that, while spent antimony fluorobromides cannot be regenerated by direct reaction with hydrogen fluoride, regeneration can be effected if they are first treated with chlorine to displace at least part of the combined bromine. The resulting chlorinated product may then be reacted with hydrogen fluoride to effect regeneration.

According to the invention an antimony-containing fluorinating agent is produced by (1) treating a spent antimony fluorobromide with free chlorine to replace at least a portion of the bromine thereof by chlorine, and (2) treating the resulting chlorinated product with from 1⅓ to 12 mols of HF per mol of chlorine used in step 1 to introduce fluorine into the molecule. Step 2 is carried out at a temperature from 50 to 200° C., preferably from 100 to 150° C.

The regenerated antimony-containing fluorinating agent produced according to the invention is particularly useful for fluorinating brominated alkanes, because the opportunity for side reactions is then minimized. It may, however, be employed to introduce fluorine into the molecule of various other halogenated alkanes. If insufficient HF is employed, to replace all the chlorine introduced into the antimony halide produced in step 1, the resulting antimony compound is both a fluorinating and a chlorinating agent. With such a compound interesting, heretofore difficultly obtainable products are readily prepared, e. g., bromochlorodifluoromethane.

In carrying out the process of the invention, the amount of chlorine used in step 1 is ordinarily from 0.05 to 1 equivalent per equivalent of bromine in the antimony fluorobromide. It is preferred to use a mol ratio of chlorine to antimony fluorobromide from 2:3 to 3:2.

The chlorination of step 1 is exothermic, and is conveniently carried out at room temperature and atmospheric pressure. If an elevated temperature is used, there is ordinarily no reason for it to be above 200° C.

Although, as has been hereinbefore indicated, the method of the invention is operable when the amount of HF used for step 2 is from 1⅓ to 12 mols per mol of chlorine used in step 1, it is usually preferred that the amount be from 2 to 6 mols per mol of chlorine. The use of the preferred proportion of HF results in substantially complete replacement of chlorine by fluorine in the regenerated fluorinating agent, so that side reactions are minimized when brominated alkanes are fluorinated therewith.

Although at least the initial stages of step 2 of the process of the invention proceed readily at atmospheric pressure, it is usually desired, when a fluorinating agent substantially free of chlorine is sought, that at least the final portion of step 2 be carried out at a pressure of 100 to 500 pounds per square inch absolute, preferably 150 to 400. Because HF (B. P. 19.4° C.) and HCl (B. P. —83.7° C.) are essentially the only gaseous products present during step 2, it is convenient to carry out this part of the process in a pressure vessel equipped with a dephlegmator, and to operate the dephlegmator at a temperature such that HF is condensed therein while HCl passes through and is exhausted from the system. The progress of the fluorination can be traced by absorbing the HCl liberated in water, and running periodic titrations on the resulting solution. If it is found in this way that the rate of fluorination has decreased materially before it has proceeded to the desired extent, the rate can be increased by increasing the pressure at which the reaction is run.

The rate at which the fluorination of step 2 proceeds can also be increased by using a catalyst. $BF_3$ gas has a catalytic action, and is advantageously added to the rection mixture, particularly during the latter stages of the fluorination. When used, $BF_3$ must be added continuously or periodically because it is exhausted from the system with HCl.

The following example illustrates a preferred embodiment, but is not to be construed as limiting the invention:

*Example*

A pressure vessel fitted with a packeted tube dephlegmator was charged with 35,390 grams (101 mols) of a spent antimony fluorobromide found to have the approximate average composition $SbF_{0.83}Br_{2.66}$. This antimony fluorobromide was unaffected by HF alone. With the dephlegmator open to the atmosphere a charge of 8,090 grams (114 mols) of chlorine was then added to the vessel. About five minutes after the chlorine addition the vessel was heated and a total of 18,210 grams (114 mols) of pure bromine distilled therefrom. The composition of the resulting antimony compound is calculated to have been $SbF_{0.83}Br_{0.38}Cl_{2.28}$. The vessel was then cooled to room temperature, charged with 9300 grams (465 mols) of HF, and heated to a temperature between 130 and 150° C for a total of 38 hours. Ice water was circulated in the dephlegmator jacket during the heating cycle. Halogen acids leaving the vessel were collected in a water scrubber. On four occasions, when the pressure in the reaction vessel dropped to about 130 pounds per square inch gauge, sufficient $BF_3$ was added to raise the pressure to about 160 pounds per square inch gauge. The $BF_3$ appeared to catalyze the fluorination. At the end of the heating cycle the vessel was exhausted of gas, which was passed through the scrubber, and was allowed to cool. A sample of the scrubbing solution was titrated, and it was ascertained that the HF absorbed amounted to 205 mols; the HCl and HBr to 231 mols. Thus, the fluorine to antimony ratio of the final product was 3.1:1. The utility of the regenerated antimony fluorobromide produced was demonstated by conversion therewith at a temperature between 130 and 150° C. and a pressure between 150 and 200 pounds per square inch gauge of 50 mols of $CBr_4$ to various fluorinated products. The composition of the material produced was as follows: $CClF_3$ 0.3 mol percent, $CBrF_3$ 38.0 mol percent, $CBrClF_2$ 9 mol percent, and $CBr_2F_2$ 42 mol percent.

Substantially equivalent results were achieved with another run using 34,525 grams (101 mols) of a spent antimony fluorobromide of average composition $SbF_{0.33}Br_{2.67}$, 6390 grams (90 mols) of chlorine, and 4540 grams (227 mols) of HF. The composition of the chlorinated antimony compound is calculated to have been $SbF_{0.33}Br_{0.89}Cl_{1.78}$. The fluorine to antimony ratio of the final fluorinating agent was found to be 2.3:1.

The method of the present invention complements our method for producing bromofluoromethanes described and claimed in abandoned application Serial No. 170,043, filed June 23, 1950, entitled Production of Bromotrifluoromethane. The two methods together provide a practicable way of producing bromofluoromethanes.

We claim:

1. A method of regenerating a spent antimony halide fluorinating agent composed essentially of the elements antimony, bromine, and fluorine and containing less than one fluorine atom per antimony atom which comprises (1) treating the spent agent with free chlorine in a proportion of from 0.05 to 1 equivalent per equivalent of bromine in the spent agent to replace at least a substantial portion of the bromine thereof by chlorine, such proportion being insufficient to increase the valence of the antimony, and (2) fluorinating the resulting chlorinated product by treatment thereof with from 1⅓ to 12 mols of HF per mol of chlorine used in step 1 at from 50° to 200° C. to replace with fluorine at least a substantial portion of the chlorine introduced in step 1.

2. A method according to claim 1 wherein the mol ratio of HF to chlorine is from 2:1 to 6:1.

3. A method of regenerating a spent antimony halide fluorinating agent composed of the elements antimony, bromine, and fluorine and containing less than one atom of fluorine per antimony atom, which comprises (1) treating the spent agent with free chlorine in a proportion of from 0.05 to 1 equivalent per equivalent of bromine in the spent agent to replace at least a substantial portion of the bromine thereof by chlorine, such treatment being carried out at a temperature between room temperature and 200° C., and removing the free bromine thus liberated, and (2) fluorinating the resulting chlorinated product by treatment thereof with from 2 to 6 mols of HF per mol of chlorine used in step 1 at from 100° to 150° C. to effect substantially complete replacement by fluorine of the chlorine introduced in step 1.

4. A method according to claim 3 in which step 1 is carried out with from ⅔ to 3/2 mol of chlorine per mol of spent agent.

5. A method according to claim 3 in which step 2 is carried out in the presence of $BF_3$.

6. In a process of regenerating a spent antimony halide fluorinating agent composed of antimony, bromine, and fluorine and containing less than one atom of fluorine per antimony atom, wherein the regeneration is to be accomplished by the action of HF, the step of treating the spent agent with free chlorine in a proportion of from 0.05 to 1 equivalent per equivalent of bromine in the spent agent to replace at least a substantial portion of the bromine thereof by chlorine prior to the regeneration step.

References Cited in the file of this patent

UNITED STATES PATENTS

| | | |
|---|---|---|
| 1,934,943 | McNary | Nov. 14, 1933 |
| 1,984,480 | Henne | Dec. 18, 1934 |
| 2,005,705 | Dandt et al. | June 18, 1935 |
| 2,510,872 | Downing | June 6, 1950 |

FOREIGN PATENTS

| | | |
|---|---|---|
| 581,666 | Great Britain | Oct. 21, 1946 |

OTHER REFERENCES

Mellor's "Inorganic and Theoretical Chem.", vol. 9, p. 467, Longmans, Green and Co., New York.